United States Patent [19]

King et al.

[11] Patent Number: 4,792,761
[45] Date of Patent: Dec. 20, 1988

[54] GEOPHYSICAL PROSPECTING WITH COLLIMATED MAGNETOTELLURIC FIELDS

[76] Inventors: Thomas C. King, Rte. 2 Box 59, San Saba, Tex. 76877; Byron T. Arnason, 4104 Honeycomb Rock Cl., Austin, Tex. 78731

[21] Appl. No.: 34,737

[22] Filed: Apr. 6, 1987

[51] Int. Cl.$^4$ .............................................. G01V 3/08
[52] U.S. Cl. ..................................... 324/350; 324/345
[58] Field of Search ............... 324/345, 347, 348, 349, 324/350, 303, 360, 363, 365, 77 R, 77 A, 77 B; 328/165; 367/43, 45, 49

[56] References Cited

U.S. PATENT DOCUMENTS

| | | | |
|---|---|---|---|
| 2,240,520 | 5/1941 | Schlumberger | 324/349 |
| 2,263,097 | 11/1941 | Marchand | 324/349 |
| 2,677,801 | 5/1954 | Cagniand | 324/350 |
| 3,188,559 | 6/1965 | Yungul | 324/349 |
| 3,986,207 | 10/1976 | Gerbel et al. | 324/350 X |
| 4,095,169 | 6/1978 | Muse | 324/345 |
| 4,210,869 | 7/1980 | Groenendyke et al. | 324/349 |
| 4,286,218 | 8/1981 | Bloomquist et al. | 324/350 |
| 4,349,781 | 9/1982 | Vozoff | 324/346 |
| 4,449,099 | 5/1984 | Hoehn | 324/350 |
| 4,591,791 | 5/1986 | Bostick, Jr. | 324/350 |

OTHER PUBLICATIONS

Yungul, "Telluric Sounding—A Magnetotelluric Method Without Magnetic Measurements", *Geophysics*, vol. 31, No. 1, Feb. 1966, pp. 185-191.

(List continued on next page.)

*Primary Examiner*—Reinhard J. Eisenzopf
*Assistant Examiner*—Warren S. Edmonds

[57] ABSTRACT

An electromagnetic survey system for geophysical exploration comprising a reconnaissance method and a survey line method. The reconnaissance method finds the principal electrical axis of conductivity of anomalous zones of conductivity by measurement of variations in the earth's magnetic field in a grid pattern over the survey area, calculation of Tipper vectors for each site, and plotting the vectors to scale. The conductivity axis is determined as being perpendicular to a set of the largest parallel vectors, one or more of which reverse direction, and passing between the direction reversal. A Survey line may be collimated with the set of enlarged vectors to make three dimensional effects more symmetrical so they are attenuated. In the survey line method the horizontal variations in the earth's magnetic field orthogonal to the survey line are measured by magnetic sensor(s) in the vicinity of and perpendicular to the line, and variations in the earth's electrical field parallel to the survey line are measured at a number of points along the line. Simultaneously, a collimating electric field measurement is taken by a dipole parallel to the survey line, preferably spanning the group of electrodes being measured, or a collimating magnetic field measurement is taken by a horizontal magnetic sensor(s) perpendicular to the survey line and remote from the noise environment of the group of dipoles being measured. Data from all measurements is converted to the frequency domain and stacked in a cross-power matrix. The impedance of each electric field measurement point along the survey line, for either collimating field measurement, is first calculated as a function of frequency as the ratio of two elements in the cross-power matrix. The numerator is the cross-power of the dipole electric field with the collimating field. The denominator is the cross-power of the survey line magnetic field with the collimating field. The impedance is next smoothed by the weighted average of adjacent dipole impedances in the calculation of the distribution of conductivity with depth. The method automatically attenuates noise in the impedance calculations, directly measures variations in the magnetic field perpendicular to the electric field for determining the impedance vs. depth under the survey line, attenuates three dimensional and near surface conductivity effects, and provides for the calculation of signal independent of noise. Data offsets are normalized.

15 Claims, 2 Drawing Sheets

OTHER PUBLICATIONS

Word et al., "Crustal Investigations by the Magnetotelluric Tensor Impedance Method", *Geophysical Monograph Series*, vol. 14, ©1971, pp. 145–167.
Sims et al., "The Estimation of Magnetotelluric Impedance Tensor Elements from Measured Data", *Geophysics*, vol. 136, No. 5, Oct. 1971, pp. 938–942.
Gamble et al., "Magnetotellurics with a Remote Magnetic Reference", *Geophysics*, vol. 44, No. 1, Jan. 1979, pp. 53–68.
Gamble et al., "Error Analysis for Remote Reference Magnetotellurics", *Geophysics*, vol. 44, No. 5, May 1979, pp. 959–968.
Labson et al., "Geophysical Exploration with Audiofrequency Natural Magnetic Fields", *Geophysics*, vol. 50, No. 4, Apr. 1985, pp. 656–664.
Schlumberger, "The Application of Telluric Currents to Surface Prospecting," *Reports and Papers, General Assembly*, 1939, pp. 271–277.

GEOPHYSICAL PROSPECTING WITH COLLIMATED MAGNETOTELLURIC FIELDS

BACKGROUND OF THE INVENTION

This invention relates to the field of geophysical exploration using measurements of naturally occurring or artificially induced micropulsations of the earth's magnetic field, and the resulting induced geomagnetic fields, and induced geoelectric (telluric) fields, collectively called magnetotelluric fields. In general most micropulsations in the magnetic field are thought to be caused by variations in the solar wind from the sun and lightning strikes. The great advantage in the use of magnetotelluric fields for geophysical exploration is that an artificial power source is not required since the natural sources provide electromagnetic waves of all frequencies. Both the variations in the earth's magnetic field and the telluric currents in the earth are random in frequency, direction and magnitude.

The flow of the telluric currents through the earth's crust depends upon the conductivity, or resistivity, of the structure of the crust at any particular point. If this conductivity can be measured and mapped, information about the structure of the crust can be obtained which can greatly aid exploration for hydrocarbons, mineral deposits, and geothermal sources as well as for scientific and geologic studies. The method is able to gain information in areas where seismic methods fail, such as in areas overlain by thick limestones or volcanics. Penetration of the earth's crust by magnetic waves or variations in the earth's magnetic field is inversely a function of frequency and conductivity, thus permitting the calculation of a conductivity profile or log from surface measurements of the magnetic and electric fields. When running a survey line Schlumberger teaches that the depth of penetration of surface measurements is approximately equal to half the measurement length on the surface, giving the possibility of the use of both the frequency and surface length to assist in depth calculations.

Methods for using magnetotelluric data began with configurations designed to yield conductivity information with depth at fixed points and evolved into configurations designed to yield conductivity information with depth along a survey line. Such methods were moderately successful so long as the conductivity of the earth in the area being surveyed varied in only one or two directions, the so called 1-D and 2-D cases. Problems with these methods became apparent when conductivity of the earth in the area being surveyed varied in three directions, the 3-D case, then all methods yielded unreliable results, or the technique was too expensive for the amount of information obtained.

SUMMARY OF THE INVENTION

In various experiments with Magnetotelluric stations the magnetic (H) field was found to be tilted from the normally horizontal plane to as much as 45 degrees in the vicinity of major faults, flanks of basins, serpentine plugs, and oil fields. Obviously any survey line, not oriented perpendicular to the conductivity axis of such zones of anomalous conductivity, would have to content with large side swipe 3-D effects. A disadvantage of conventional methods is that there is no provision to find the principal axis of conductivity of anomalous zones before a line was run. If a survey line could be oriented perpendicular to the principal electrical axis of such anomalies before the line was run, the 3-D effects would be more symmetrical and would largely cancel out.

The disadvantage of conventional methods is that they discover the problem of 3-D effects after the survey line is run and when the reliability of the data is in question.

One method which attempts to attenuate 3-D effects along a survey line, is described by Bostick in U.S. Pat. No. 4,591,791. Bostick measures the variations in the earth's magnetic field in the conventional manner, in at least two horizontal, non-parallel directions at at least one point in the survey area, and teaches the filtering of the impedance by smoothing the impedance along the dipoles. A disadvantage of the Bostick method is that two sources of error may be introduced when the magnetic field is measured at fixed sites not on the survey line. If the site for measuring the magnetic field is near an anomalous zone of conductivity, measurements of the magnetic field will be distorted by the tilt of the magnetic field reflected from the conductivity anomaly, and these erroneous magnetic field measurements will be used in impedance, depth and resistivity calculations for all the dipoles measured simultaneously with it along the line. If on the other hand the site for measuring the magnetic field happens to be located where there are no anomalies, and an anomalous zone of conductivity occurs on, or near, the survey line, then an incorrect magnetic field measurement will be used in the calculations for the survey line at those dipoles near the anomaly. Permutations and combinations of these errors affect the reliability of the survey. Therefore there is no assurance that any portions of the calculations are free of error.

Other conventional methods teach the measurement of the vertical field along the survey line to help interpret 3-D effects. They make no provision to use the vertical field information to find conductivity anomalies before the survey line is run, or to correct 3-D effects discovered thereby, or to properly re-orient the direction of the survey line across the anomaly to minimize them, nor to use the vertical component of the field to pick a suitable magnetic field measurement site free of 3-D effects in the data.

The above noted and other disadvantages of the prior art are overcome by providing an electromagnetic geophysical reconnaissance method to attenuate side swipe effects from anomalous zones of conductivity by providing means of locating such anomalies and determining their principal electrical axis of conductivity. A survey line may then be oriented perpendicular to the conductivity axis so three dimensional effects are largely symmetrical to the line and cancel.

According to one embodiment of this aspect of the invention, variations in the earth's magnetic field are measured at a plurality of points throughout the survey area, insofar as possible or convenient in a grid pattern, by three magnetic sensors, each perpendicular to each other. The preferred orientation is that one sensor be vertical, one oriented horizontal and positive north, the other horizontal and positive east. Data from the magnetic sensors is processed to a Tipper vector representing the tilt-direction of the magnetic field for each frequency band at each point. For selected bands of frequencies the principal axis of conductivity is determined for any anomalies found as being perpendicular to the principal set of enlarged Tipper vectors which are substantially parallel to each other and passing between those vectors which reverse direction.

In a preferred embodiment of this aspect of the invention the variations in the earth's magnetic field are measured in at least two horizontal, non-parallel directions at at least one point in the survey area. The preferred orientation is that one magnetic sensor be horizontal and positive north, the other horizontal and positive east. Simultaneously variations in the earth's magnetic field are measured in the vertical direction at each of a plurality of points throughout the survey area, insofar as possible, or convenient, in a grid pattern. The data from each vertical magnetic field site measured is transmitted to a common point and with the two horizontal magnetic field measurements, common to all the vertical field measuring points, processed to a Tipper vector representing the tilt-direction of the magnetic field for each frequency band at each vertical magnetic field measurement point.

The tipper vectors are then plotted to scale for each measurement point. For selected bands of frequencies the direction of the principal axis of conductivity is determined for any anomalies found as being perpendicular to the principal set of enlarged Tipper vectors which are substantially parallel to each other and between the parallel Tipper vectors that reversed direction across the anomaly.

It is a further object of this aspect of the inventive system to orient a survey line or lines perpendicular to the principal axis of conductivity of such conductivity anomalies so that most three dimensional effects become symmetrical to the survey line and cancel out. In a preferred embodiment the survey line is oriented perpendicular to the conductivity axis of an anomaly by collimating the survey line with the largest set of Tipper vectors, representing the tilt-direction of the magnetic field.

It is also an object of this aspect of the inventive system to pick a suitable site in the survey area for a base and reference station which has a minimum of adverse effects from conductivity anomalies. In this aspect of the inventive system, the base site is selected where the Tipper vectors representing the tilt-direction of the variations in the magnetic field are a minimum.

Conventional practice suffers from many problems in running survey lines. One disadvantage of conventional methods in running a survey line is that two orthogonal magnetic sensors are used to measure two horizontal components of the variations in the earth's magnetic field. No provision is made to use the directional characteristics of the magnetic sensors, oriented orthogonal to the direction of the survey line, to collimate the magnetic field measurement and filter out side swipe effects along the line. Since the impedance as a function of frequency is proportional to the ratio of the electric field to the magnetic field, the two fields should be measured over the same portion of the survey line for the impedance calculation to be accurate.

Another disadvantage in the use of two non-parallel magnetic sensors to accomplish one effective measurement is that the complexity of the calculations in the cross power stack of the data increases greatly with the number of magnetic (H) channels measured. Up to six different estimates of the magneto-telluric impedance tensor elements are computed from measured data by use of auto-power and cross-power spectra, requiring the solution of an involved set of simultaneous equations to calculate the impedance and the noise, which in practice means considerable computer time. The conventional belief, based on the equations used, requires that two magnetic field measurements must be made with different source polarities in order to compute the proper signal and noise spectra separately (Sims, et al, 1971). This theory has hindered development of simpler and more effective systems.

If the earth were homogeneous, variations in the earth's magnetic field Hy at right angles to the survey line would induce variations in the electric field Ex along or parallel to the survey line. Near surface conductivity anomalies, however, may alter the flow of current at the surface. For example, if a strong shallow conductor, such as a buried sand channel full of salt water, crossed the survey line, induced currents would follow the conductor thus distorting measurements of the electric field at the surface. Near surface conductors have negative effects on accuracy and reliability of the data from conventional magneto-telluric systems. Calculations of impedance as a function of frequency for the dipoles in the vicinity of a meandering near surface conductor can be unreliable and in error. The problem is often the rule rather than the exception and it may be impractical or impossible to orient the survey line at right angles to the buried conductor to make these near surface effects symmetrical to a survey line.

Noise from within the instruments, and external noise from power lines, cathodic protection along pipelines, electric fences, and wind moving tree roots, fences, etc., associated with the measurement of magnetotelluric fields may be a million times greater than the desired signals and can be ten million times greater. Ingenious methods are required to obtain magnetotelluric measurements which will yield reliable and meaningful results. Since the noise is so many times larger than the signal, any method of measuring the variations in the magnetic field must have means of attenuating the noise and calculating the signal and noise power spectra independent of each other, and of calculating the coherence between elements of the system. Otherwise there is no way of distinguishing the noise from the signal.

Referencing techniques provide a method of attenuating noise and of calculating the signal and noise power spectra independently, but they have always been used with conventional configurations of 2 orthogonal, horizontal magnetic sensors. (Gamble, et al, 1979). These conventional methods are inefficient, requiring at least 2 additional magnetic sensors remote from the noise environment of the 2 sensors measuring the magnetic field in the survey area, for a minimum of 4 sensors being measured simultaneously in a referenced survey, none of which necessarily measure the variations of the magnetic field perpendicular to the line of dipoles. Natural and artificial noise in the local environment make it difficult to acquire good data in the field without some method of referencing.

The above noted and other disadvantages of the prior art in running electromagnetic survey lines are overcome by providing an efficient electromagnetic geophysical method of running a survey line which gives reliable results in the presence of noise and variations of the conductivity of the earth's structure in survey areas.

It is therefore another object of the inventive system to provide a method of running a survey line using a simplified method of measuring horizontal variations in the earth's magnetic field in the vicinity of a survey line with a minimum of magnetic sensors, which simultaneously provides for the:

measurement of the transverse horizontal magnetic field in the vicinity of the dipoles measuring the electric field;

using the directional characteristics of individual magnetic sensors to attenuate side swipe effects from anomalous zones of conductivity;

attenuation of noise automatically in the method of calculation of the impedance (Zxy) at each dipole;

calculation of the impedance (Zxy) as a function of frequency by a simple ratio of elements of the cross-power matrix;

ability to calculate the signal and noise spectra independently.

According to one embodiment of this aspect of the inventive system, the electromagnetic geophysical method for a survey line consists of at least three sets of simultaneous measurements:

measuring variations in the earth's electric field along and parallel to the survey line by a plurality of electrodes in electric contact with the earth;

measuring the variations in the earth's magnetic field with one or more line magnetic sensors emplaced horizontally and orthogonal to the survey line;

measuring the variations in the earth's electric field by taking a collimating electric field measurement with a dipole consisting of two electrodes in contact with the earth on or parallel to the survey line, preferably spanning the outer electrodes in a group of electrodes which may be less than all the electrodes along the line.

The data accumulated over a period of time from the magnetic field measurement and the electric field measurements is converted to the frequency domain and stacked (averaged) in a cross-power matrix. The impedance Zxy at each dipole is calculated as a function of frequency by taking the complex ratio of two elements in the cross-power matrix.

The numerator of the ratio is the cross power of the electric field data for the dipole on the survey line, with electric field data from the collimating dipole.

The denominator of the ratio is the cross power of the line magnetic sensor data with electric field data from the collimating dipole.

The longer the collimating dipole the more the near surface effects are averaged out. All horizontal magnetic sensors, being perpendicular to the survey line, are parallel to each other.

According to an alternate embodiment of this aspect of the inventive system the electromagnetic geophysical method for a survey line consists of at least three sets of simultaneous measurements:

measuring the variations in electric field by a plurality of electrodes in electrical contact with the earth along or parallel to the survey line.

measuring the variations in the earth's magnetic field with one or more line magnetic sensors emplaced horizontally and orthogonal to the survey line;

measuring the variations in the earth's magnetic field by a collimating magnetic field measurement using magnetic sensor(s) arranged horizontal and orthogonal to the survey line but remote from the noise environment of the line magnetic sensor(s) and the group of dipoles being measured along the survey line.

The data accumulated over a period of time from the electric field measurements and from both magnetic field measurements is converted to the frequency domain and stacked in a cross-power matrix. The impedance (Zxy) at each point (dipole) is calculated as a function of frequency by taking the complex ratio of two elements in the cross-power matrix.

The numerator of the ratio is the cross power of the electric field data for a dipole on the survey line, with the collimating magnetic sensor data;

The denominator of the ratio is the cross power of the line magnetic sensor data, with the collimating magnetic sensor data.

All horizontal magnetic sensors, being perpendicular to the survey line, are parallel to each other. Then, for either embodiment of the survey line method, and for predetermined frequencies, the weighted averages of the impedances may be calculated such that the number of impedances entered into each weighted average increases with decreasing frequency in such a way that the number is substantially proportional to the effective depth of penetration into the earth of an electromagnetic wave of that frequency. Finally, the distribution of conductivity in the earth below the survey line is calculated as a function of depth from the weighted averages of the impedances.

In the preferred embodiment the weighted averages of the impedances are calculated using a zero phase finite length weight function, the width of the weight function for each frequency being determined by selecting an appropriate width (ie: twice the estimated depth), obtaining a weighted average impedance using the selected function, using the weighted average so obtained to calculate an apparent depth of penetration, comparing the calculated depth of penetration to the expected depth of penetration, using the difference between the calculated and expected depths to assist in the selection of a more appropriate width, and repeating the process iteratively until a predetermined accuracy of calculation of the depth of penetration is obtained.

In yet another embodiment the resistivity distribution with depth at each electric field measuring point is calculated as a function of frequency by assuming a resistivity, calculating a depth with a resistivity-to-depth inversion function, multiplying the calculated depth by a number (ie: between 2 and 3) to get the length in a zero phase length weight function, convolving the adjacent dipole impedances within the window of the zero phase function to get the weighted average smoothed impedance, using this smoothed impedance to calculate a new resistivity, using the new resistivity to calculate a new depth with the resistivity-to-depth inversion, comparing the new depth with the previous depth and continuing to iterate until the new depth differs from the previous depth by a predetermined fractional amount, then saving the new depth and resistivity for that frequency as the best fit estimates, and continue with the next frequency until all the measuring points have been calculated for all frequencies.

In another embodiment at least one of the dipoles in one group of electrodes along the survey line is also a dipole in the adjacent group.

In yet another embodiment the step of measuring the variations in the earth's electrical field along the survey line consists of measuring the variations in the potential differences between one or more pairs of electrodes in electrical contact with the earth and spaced at substantially equal distances along the survey line. The electric field in each case is found by dividing the measured potential differences by the distance between the electrodes.

In a further embodiment members of a group of electrodes along the survey line, consisting of less than all the electrodes, is measured simultaneously with one or more magnetic sensors along the survey line, and with one or more collimating magnetic sensors, remote from the noise environment of the group of electrodes being measured.

A disadvantage of many conventional methods is that there is no provision made to correct for offsets in impedance from measurements of the magnetic field at different points along the survey line.

It is a yet another object of the inventive system to provide methods for adjusting offsets in the calculated impedances (Zxy) for each group of dipoles, consisting of less than all the dipoles, along a survey line.

In one embodiment the variations in the potential differences between the members of a group of adjacent electrodes, consisting of less than all the electrodes, are measured. Each group is measured sequentially along the line. At least one dipole is common between adjacent groups and is measured at least twice, once with the group on one side and once with the group on the other side.

In a still further embodiment variations in the earth's magnetic field are measured by magnetic sensors spaced singly along and orthogonal to the survey line within a group of electrodes, consisting of less than all the electrodes, and less than all the magnetic measuring points. Each group is measured sequentially along the line. At least one magnetic sensor is common between adjacent groups and is measured at least twice, once with the group on one side, and once with the group on the other side.

In a yet still further embodiment a dipole is set up to measure the electric field in a location remote to the noise environment of survey line but parallel to the line, preferably at the base station. This remote electric field measurement is measured simultaneously with each group of electrodes, consisting of less than all the electrodes, along the survey line.

DETAILED DESCRIPTION

Figure 1:
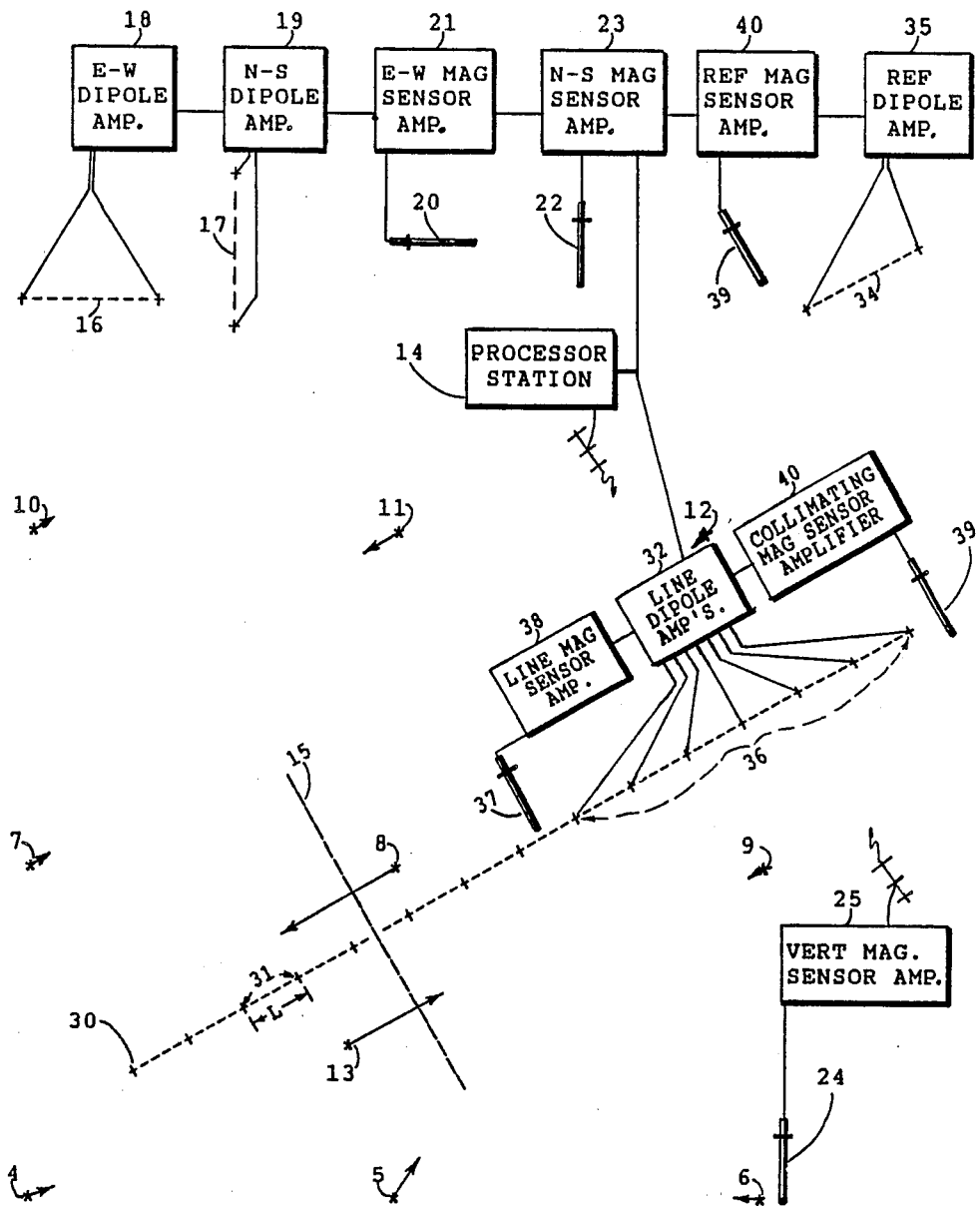
FIG. 1 is a diagrammatic representation of a plan view of the survey field showing a grid of magnetic field measurement sites and calculated Tipper vectors displayed. The principal axis of conductivity of a conductivity anomaly is shown as determined. A survey line is shown, oriented perpendicular to the conductivity axis of the anomaly, with a base and processor station.

A field layout for the survey area in accordance with one aspect of the present invention to ascertain the principal axis of conductivity of buried conductivity anomalies is shown in FIG. 1. Variations in the earth's magnetic field are measured by conventional magnetic field sensors 20 and 22 connected to filtering and amplification sections 21 and 23. The magnetic sensors are emplaced in two non-parallel directions, preferably orthogonal to each other and oriented positive north and positive east at base site and processor station 14. Simultaneously, the vertical component of the variations in the magnetic field are measured by vertical magnetic sensor 24 connected to its filtering and amplification section 25 at a plurality of sites in a pattern over the survey area and transmitted to the processing station 14. Data may also be acquired from reference dipoles 16 and 17 connected to their filtering and amplification sections 18 and 19. Noise picked up by magnetic sensors 20 and 22 caused by passing cars, trees and fences shaken by the wind, etc., is generally incoherent to electric field noise picked up by reference dipoles 16 and 17. Additionally dipoles 16 and 17 have a much higher signal to noise ratio than the magnetic sensors. If enough data is taken, referencing calculations, including dipoles 16 and 17, familiar to those skilled in the art attenuate the noise during the processing of the data to the required Tipper vectors.

Data may be transmitted in real time by radio telemetry, by fiberoptic cable transmission or by wire, or transported on a storage medium. In most instances more efficient results are obtained transmitting the data by radio telemetry from the vertical magnetic field sensor, and transmitting the data by cable from all other stationary sensors and dipoles to the processor station.

In another embodiment of this aspect of the inventive system three magnetic sensors, perpendicular to each other, preferably oriented one vertical and positive down, one positive north and one positive east, are used to measure the variations in the earth's magnetic field at each site in the pattern, and the data transmitted to the processing station.

All analog signals are stage amplified with appopriate power line frequency notch, low cut and high cut filters between the stages of amplification to improve the signal to noise ratio and to prevent the noise signal from saturating the amplifiers. The time domain data for each channel is next converted to the frequency domain by fast Fourier transform, or similar transform, and stacked in a cross-power matrix.

In the calculations of the Tipper vectors, the coordinate system is rotated mathematically to the direction in which the horizontal magnetic field is most highly anti-coherent with the vertical magnetic field, and the azimuth of this direction is the azimuth of the Tipper vector T. Then the Tipper components parallel to the azimuth direction (Tx), and perpendicular to the azimuth direction (Ty) are calculated. If reference dipoles 18 and 19 are used to attenuate the noise, the referencing field data is substituted in the calculations. Tx, or a multiple thereof, is used as the size of the Tipper Vector T. These Tipper vectors are thus calculated by standard methods familiar to those skilled in the art, and plotted to scale on a map.

In FIG. 1, an anomalous zone of conductivity is shown as indicated by the enlargement of the Tipper vectors at sites 8 and 13. Since the original pattern of sites may be widely spaced, check site(s) 13 may be run to fill in the pattern when one or more enlarged Tippers are found, such as at site 8. The principal axis of conductivity 15 for a conductivity anomaly is thus determined as being perpendicular to enlarged Tippers 8 and 13 and passing between the direction reversal. The survey line 30 may then be laid out perpendicular to the principal axis of conductivity 15.

The shape of the magnetic field over a buried conductivity anomaly may be compared to a standing wave, the shape of which is a function of the subsurface conductivity distribution irrespective of the polarization of the inducing field. It can also be seen that the shape of the magnetic standing wave will vary with decreasing frequency as the depth increases from the measuring point into the earth, and the surface measurement of decreasi frequency and increasing depth will be measuring data from an increasing volume of the earth.

Measurements of the variations of the magnetic field at a point on the earth's surface over the anomaly may be displayed as a Tipper vector whose magnitude is proportional to the tangent of the tilt angle of the magnetic field at the point of measurement and whose direction is toward the crest of the standing magnetic wave. It can be seen from the analogy of the standing wave, that if a number of measurement sites were made in a pattern over the area around the conductivity anomaly, that the largest Tippers, representing the greatest angle of tilt of the magnetic field on the flanks of the standing wave would point to the crest of the standing magnetic wave and would reverse directions on the opposite side.

Since even conductivity anomalies which vary in three dimensions (3-D) have linear or two dimensional characteristics for short distances the principal axis of conductivity can be determined if enough Tipper vector sites are taken. The principal axis of conductivity is perpendicular to the largest parallel Tippers and passing through the zone of direction reversal.

Once the principal axis of conductivity 15 of the anomaly is determined, a survey line 30 may then be collimated with the largest set of parallel vectors 8 and 13 which reverse directions. The survey line is thus perpendicular to the conductivity axis of the anomaly, such that three dimensional variations in conductivity become generally symmetrical to the line, and side swipe effects are largely canceled out. Field layouts for such a survey line 30 in accordance with this aspect of the present invention is shown in FIG. 1.

It can be understood that in some instances no enlarged Tippers would be found, indicating no conductivity anomaly is present. Orientation of a survey line would then be satisfactory in most any convenient place and direction. The survey area might be moved until a conductivity anomaly is found. It is also possible that the tilt-direction Tipper vectors would increase on the edge of the survey area, which might indicate the entire survey area should be moved to bracket the potential anomaly found.

It can also be seen that the method may be used to pick base sites with a minimum of three dimensional effects. For example the Tipper vectors at sites 1, 2, 3, 10, and 12 are very small indicating that these sites are free of the effects of conductivity anomalies.

Further it is possible that this Tipper vector method might be used to orient any type of survey line across an anomaly so discovered, such as seismic or induced polarization, which methods also have difficulty resolving three dimensional effects. One problem of the Tipper vector reconnaissance method is that the depth, as an inverse function of frequency, is not uniquely determined without some independent measurement of the resistivity.

CONVENTIONAL THEORY OF THE DETERMINATION OF IMPEDANCE ALONG A SURVEY LINE

The determination of a reliable and repeatable estimate of impedance Zxy as a function of frequency at any measurement point or dipole is the goal of magnetotelluric methods. Once this is accomplished the distribution of conductivity or resistivity with depth can be calculated with reasonable assurance that a resulting displayed sounding or profile will be a representation of the underlying structure.

To accomplish the determination of the impedance Zxy, essentially all electromagnetic methods acquire data sets over a period of time by measurement of the variations in electrical and magnetic fields to provide a statistical ensemble which can be manipulated to produce an estimate of the impedance Zxy.

The relationship between an electric field Ex measurement at a dipole and the magnetic field orthogonal components Hx and Hy in a noise free environment and normally incident source fields is expressed as:

$$Ex = ZxxHx + ZxyHy \qquad (1)$$

Real measurements almost always include great amounts of noise in the data which we can call N, so the equation may be better expressed as:

$$Ex = ZxxHx + ZxyHy + N \qquad (2)$$

Fortunately the impedance varies little with frequency so instead of having to calculate it for a precise frequency, we can stack the cross-power of the measured data over narrow frequency bands in elements, like mail boxes or bins, in the cross-power matrix. If we represent the above equation in a narrow frequency band with real measured data subscripted by i, then:

$$Exi = ZxxHxi + ZxyHyi + Ni \qquad (3)$$

The goal is to solve this equation for Zxy with measured data in the face of vast amounts of noise.

Conventional methods require the measurement of variations in the earth's magnetic field by two orthogonal magnetic sensors at a station to give the two components of the magnetic field, Hx and Hy. The electric field Ex is measured by dipole(s) parallel to the direction of the survey line. To acquire reliable and repeatable data the conventional method must have means to eliminate noise. The accepted method of attenuating noise is called referencing, which uses an additional pair of orthogonal magnetic sensors, measuring magnetic field components Rx and Ry, remote from the noise environment of the first two magnetic sensors at the station. For the minimum configuration, the conventional method requires a total of 4 magnetic field channels and 1 electric field channel, or a minimum of 5 analog channels of data. These are digitized, transformed into frequency components and stacked in the cross-power matrix.

Since the survey line may be oriented in some direction other than the orthogonal orientations of the magnetic sensors, the two components of the magnetic field must be rotated by an additional calculation so that Hx represents the field components parallel to the line; and Hy represents the field components perpendicular to the line. This may be done in the frequency domain, but most efficiently in the cross-powers. Referencing is the accepted method to attenuate noise and obtain the most reliable data. If Rx and Ry represent the two components of the referencing field, the calculation of the impedance, Zxy, involves the solution of a series of simultaneous equations, accomplished expanding the determinants:

$$Zxy = \frac{\begin{vmatrix} <Ex|Ry> & <Hx|Ry> \\ <Ex|Rx> & <Hx|Rx> \end{vmatrix}}{\begin{vmatrix} <Hx|Rx> & <Hy|Rx> \\ <Hx|Ry> & <Hy|Ry> \end{vmatrix}} \quad (4)$$

valid only if the expansion of the denominator, $<Hx|Rx><Hy|Ry> - <Hx|Ry><Hy|Rx>$, does not approach or equal zero. The validity and accuracy of this conventional impedance calculation depends upon the random nature of the magnetic field. In actual practice the magnetic field is not always random, but is polarized from time to time in one direction only and the expansion of the denominator of the above determinant approaches a divide by zero condition, and is said to "blow up". A new data set with different polarization characteristics is then required and more time in the field is wasted. Thus the best conventional practice involves extensive calculations using an unstable method for the determination of an estimate of the impedance Zxy and a minimum of 5 data channels.

The inventive method, which for identification we will call the collimating method, solves equation (2) for the determination of Zxy $$Ex = ZxxHx + ZxyHy + N \quad (2)$$

with simpler measurements and stable calculations which overcome many of the deficiiencies and unstable nature of conventional methods.

Figure 2:
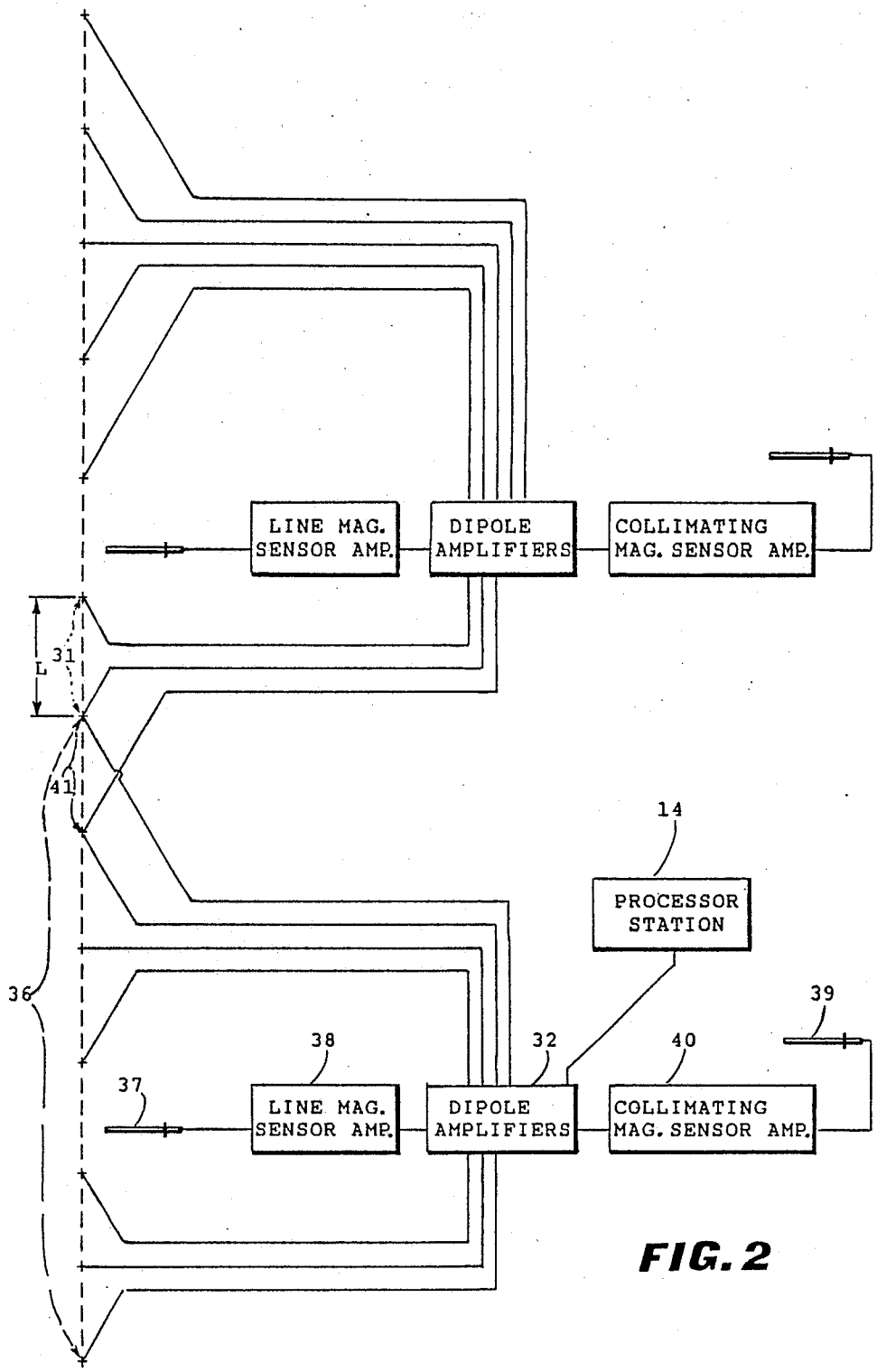
FIG. 2 is a diagrammatic representation of the survey line.

The field layouts for a survey line 30 in accordance with the present invention is shown in FIG. 1 and FIG. 2. A suitable survey line 30 is determined and laid out, preferably oriented perpendicular to the principal axis 15 of any conductivity anomalies found to be present as shown in FIG. 1. A plurality of electrodes 31 are installed in electrical contact with the earth spaced preferably at equal lengths L along the survey line. Adjacent electrodes are connected by wires to a potential difference sensor 32 containing the analog filtering and amplification sections.

One or more line magnetic sensors 37 connected by wires to the analog filtering and amplification section 28 are emplaced orthogonal to the survey line and parallel to each other. Data from all magnetic sensors in the vicinity of the survey line, except collimating magnetic sensor(s) 39, may be averaged into a single channel of data. Line magnetic sensor(s) 37 are connected by a cable to analog section 38, and the collimating magnetic sensor(s) 39 are connected by a cable to analog section 40.

An advantage inherent in measuring the magnetic field by sensors spaced singly along the line is that the net horizontal component of the magnetic field orthogonal to the survey line will be equal to the incident field plus the reflected field from buried conductors and thus will be a more accurate estimate of the real conditions along survey line 39 than distant magnetic field measurements at a fixed station as is generally the case with conventional methods. As can be seen in FIG. 2 complete data for the calculation of the transverse component of impedance along the survey line 30 can be acquired efficiently by the use of only one magnetic sensor 37, on or in the vicinity of the survey line provided the collimating dipole 36 is also measured simultaneously with the group of dipoles being measured. Alternately as can be seen in FIG. 2 complete data for the calculation of the transverse component of impedance along the survey line 30 can be acquired efficiently by the use of only two magnetic sensors.

Line magnetic sensor 37 is emplaced orthogonal to survey line 30, and simultaneous measurement is taken by the other collimating magnetic sensor 39, parallel to the line magnetic sensor 37 and remote from the noise environment of the line magnetic sensor 37 and the dipole(s) being measured. Both methods might be used to double check the impedance calculations.

Data from the potential difference sensors 32 and 35, and both sets of magnetic analog sections 38 and 40 may be transmitted to the processor station 14 by radio, cable or recorded on a mass storage medium at the recording sites and transported to the processing station 14.

The inventive system may use two alternate means of collimating measurement combinations for the determination of the transverse magnetic component of impedance Zxy as shown in FIG. 2:

In one embodiment the collimating measurement (E'x) is of the electric field. At least three simultaneous measurements are taken:

variations in the earth's magnetic field are measured by horizontal line magnetic sensor(s) 37 orthogonal to and in the vicinity of survey line 30;

variations in the earth's electric field are measured by a plurality of electrodes 31 in electric contact with the earth forming individual dipole channels with potential difference sensors 32. The electric field for each dipole is calculated as the measured field divided by the distance between electrodes;

variations in the electric field are measured by collimating dipole 36, which preferably would be on line 30 and much longer than any single dipole along the line for greater noise rejection. It is a simple matter in potential difference sensor 32 to connect the first and last electrodes being measured of a group of electrodes to the form dipole 36, and to calculate the collimating electric field (E'x) by dividing the measured field by the distance between the two electrodes.

In the preferred embodiment the collimating measurement (H'y) is of the magnetic field. At least three simultaneous measurements are taken:

variations in the earth's magnetic field (Hy) are measured by horizontal line magnetic sensors 37 orthogonal to and in the vicinity of survey line 30;

variations in the earth's electric field (Ex) are measured by a plurality of electrodes 31 in electric contact with the earth forming individual dipole channels with potential difference sensors 32. The electric field for each dipole is calculated as the measured field divided by the distance between electrodes;

variations in magnetic field (H'y) are measured by collimating magnetic sensor(s) 39, parallel to and remote from the noise environment of the line magnetic sensor(s) 37 and the group of dipoles being measured.

COLLIMATED THEORY OF THE DETERMINATION OF THE IMPEDANCE—Zxy

Referring again to equation (2): $Ex = ZxxHx + ZxyHy + N$, which equation must be solved for Zxy by the inventive method. This is accomplished as follows:

For the sake of simplicity for both the above collimating embodiments we will represent the collimating field, $C=E'x$, as an electric field parallel to, or, $C=H'y$, a magnetic field perpendicular to the survey line, and we use the magnetic field, $C=H'y$, in the example. If we represent the above equation (2) in a narrow frequency band with actual measured data subscripted by i, and the equation is multiplied through by the same narrow band of frequencies from the complex conjugate of the collimating field $Ci^*$ as a summation over the time T.

$$\sum_{i=1}^{T} ExiCi^* = \sum_{i=1}^{T} ZxxHxiCi^* + \sum_{i=1}^{T} ZxyHyiCi^* + \sum_{i=1}^{T} NiCi^*$$

or better in cross-power notation: $<Ex|C> = Zxx<Hx|C> + Zxy<Hy|C> + <N|C>$. (5)

The mathematical basis of the solution for Zxy lies in understanding the behavior of the terms in the above equation over a period of time, or for a finite number of estimates T. For the $Zxx<Hx|C>$ term, the cross-power, $<Hx|C>$ represents the power which is coherent between the magnetic field parallel to the line, and the collimating field. Typically Hx and C are incoherent with respect to one another and their product (cross-power) will decrease in magnitude with increasing T, and can be made arbitrarily small by making T correspondingly large. The coefficient of the Zxx term therefore becomes arbitrarily small and the entire term can be neglected.

Similarly, the cross power $<N|C>$ of the noise N and the collimating field C will be incoherent if C is measured in a different noise environment or with different noise characteristics. This term will decrease in the same manner and can be made arbitrarily small by making T correspondingly large.

However, in the remaining terms, $<Ex|C>$ and $<Hy|C>$, the collimating field is coherent or partially coherent so these increase with increasing T.

The equation now reduces to the much simpler form with large T:

$$<Ex|C> = Zxy<Hy|C>$$

which can be easily solved for Zxy:

$$Zxy = \frac{<Ex|C>}{<Hy|C>} \quad (6)$$

A comparison of the inventive method with the conventional method of the determination of the impedance as a function of frequency using the preferred field embodiments follows:

| Item | Conventional Method | Inventive Collimating Method |
|---|---|---|
| Minimum No. dipoles | 1 | 1 |
| Minimum No. Magnetic Sensors | 4 | 2 |
| Cross-Power | 8 terms | 2 terms |
| Coordinate rotation required | yes | no |
| Equation | $Zxy = \dfrac{\begin{vmatrix} <Ex\|Ry> & <Hx\|Ry> \\ <Ex\|Rx> & <Hx\|Rx> \end{vmatrix}}{\begin{vmatrix} <Hx\|Rx> & <Hy\|Rx> \\ <Hx\|Ry> & <Hy\|Ry> \end{vmatrix}}$ | $Zxy = \dfrac{<Ex\|C>}{<Hy\|C>}$ |
| Fourier transformed | 5 channels | 3 channels |
| Computer time | 4 units | 1 unit |
| Stability if source field is polarized | unstable | stable |

As can be seen the inventive method is much more efficient in field procedures and computer time than the conventional method.

Additionally, filtering of near surface effects is accomplished by smoothing the individual dipole impedances using a running or weighted average of the adjacent impedances along the line 30 in the final calculations of conductivity distribution with depth. One method of smoothing the impedances is by convolving the adjacent dipole impedances in the window of a zero phase function, such as a Sinc (Sin X/X) or Cosine bell function. Or for predetermined frequencies, the weighted averages of the impedances are calculated such that the number of impedances entered into each weighted average increases with decreasing frequency in such a way that the number is substantially proportional to the effective depth of penetration into the earth of an electromagnetic wave of that frequency. The distribution of conductivity in the earth below the survey line being measured at the time is calculated as a function of depth from the weighted averages of the impedances.

Similarly, another method of smoothing the impedance and calculating the resistivity distribution with depth at each electric field measuring point as a function of frequency is by assuming a resistivity, calculating a depth with a resistivity-to-depth inversion function, multiplying the calculated depth by a number (ie: the Schlumberger length to depth ratio of (2) to get the length in a zero phase length weight function, convolving the adjacent dipole impedances within the window of the zero phase function to get the weighted average smoothed impedance, using this smoothed impedance to calculate a new resistivity, using the new resistivity to calculate a new depth with the resistivity-to-depth inversion, comparing the new depth with the previous depth and continuing to iterate until the new depth differs from the previous depth by a predetermined fractional amount, then saving the new depth and resistivity for that frequency as the best fit estimates, and continue with the next frequency until all the measuring points have been calculated for all frequencies.

The measurement of variations in the magnetic field at different points along a long survey line gives rise occasionally to offsets in the data. Three methods are employed to compensate for these offsets.

One embodiment to compensate for offsets in data is shown in FIG. 2. A common dipole 41 is measured with one group of dipoles along line 30 and then measured with the adjacent group of dipoles. Impedances are calculated for the common dipole as a function of frequency when measured with the one group, and another set of impedances are calculated for the common dipole when measured with the adjacent group of dipoles. Any offsets in the data between the two groups of dipoles are backed out by comparing the two sets of impedances for the common dipole. Similarly a common dipole 34, as shown in FIG. 1, may be measured at a remote place, preferably at the base and processor station 14 with every group of dipoles measured along line 30. Impedances are calculated for the common dipole as a function of frequency when measured with every group of dipoles along survey line 30. Any offsets in the data are backed out by comparing the sets of impedances for the common dipole 34.

In another embodiment to compensate for offsets in data, a common magnetic sensor(s) 42 as shown in FIG. 1 is measured with one group of dipoles along line 30 and again measured with the adjacent group of dipoles. The magnetic data from the common magnetic sensor(s) measured with the one group of dipoles is compared with the magnetic data from the common magnetic sensor(s) when measured with the adjacent group of dipoles. Any offsets in data are backed out by comparing the two sets of magnetic data.

The mathematical routines by which the various computations are made is not a part of the invention. It can be appreciated by those skilled in the art that the computations involved may be conveniently made by use of a programmed digital electronic computer. Programs for the performing of the Fourier transforms, the zero phase finite length weight functions (Sinc and Cosine Bell, etc), the calculations for Tipper vectors, the cross-power complex multiplications, and the one dimensional inversion procedure are readily available.

The magnetic field is usually consistent over considerable distances except in the proximity of anomalies. We find in using the inventive system in areas where large anomalies are not present that variations in the magnetic field may often be measured successfully at a distance from the survey line by two or more parallel magnetic sensors orthogonal to the survey line.

When anomalies are indicated on a section of the line, this section can be run again to advantage with the magnetic sensors emplaced on or very close to the line to more accurately resolve any 3-D effects present. In any case at least one of the magnetic sensors, the collimating magnetic sensor, must be removed from the noise environment of the other(s) to obtain good signal to noise ratios.

Changes in direction or curves in a survey line are made up of straight line dipole segments. Each segment may be accurately determined by the methods described as if it were a survey line in itself and integrated mathematically into the smoothing calculations for an entire survey line.

Magnetic sensors used were of the conventional type. They consisted of 20,000 to 40,000 turns of copper wire wound on a core of high permeability magnetic alloy. The windings were encased with a grounded Faraday shield. An internal low noise pre-amplifier was used, which was chopper stabilized.

Additional advantages and modifications will be readily apparent to those skilled in the art. The invention in its broader aspects is therefore not limited to the specific details, representative apparatus or the illustrative example shown and described. Accordingly, departures may be made from the detail without departing from the spirit or scope of the disclosed general inventive concept.

What is claimed is:

1. An electromagnetic geophysical reconnaissance survey method comprising:
    measuring the variations in the earth's magnetic field in at least three non-parallel directions perpendicular to each other at a plurality of points in a pattern throughout the survey area;
    calculating as a function of frequency a vector representing the tilt and direction of tilt of the variations in the earth's magnetic field at each measurement site;
    plotting the vectors to relative scale and position to each other;
    selecting a set of abnormally large vectors which are substantially parallel to each other, and one or more of which vectors are reversed in direction, as the indicators of a conductivity anomaly;
    orienting the conductivity axis of the anomaly as a line perpendicular to the largest of the selected vectors and between the direction reversal of the vectors.

2. An electromagnetic geophysical reconnaissance survey method as described in claim 1, wherein the two horizontal measurements in the variations in the earth's magnetic field are measured at one point in the survey area and the vertical measurement in the variations of earth's magnetic field is measured at the plurality of points in a pattern over the survey area.

3. An electromagnetic geophysical reconnaissance survey method as described in claim 1, wherein a survey line is collimated with the principal set of enlarged tilt-direction parallel vectors, one or more of which show reversed directions.

4. An electromagnetic geophysical survey method for a survey line comprising:
    measuring the variations in the earth's electrical field parallel to the survey line at a plurality of points along the survey line;
    simultaneously measuring the variations in the earth's magnetic field horizontally and orthogonal to the direction of the survey line at at least one point in the vicinity of the survey line;
    simultaneously taking a collimating electric field measurement of the variations of the earth's electric field by a dipole consisting of two electrodes in contact with the earth on or parallel to the survey line;
    transforming the measured variations in the magnetic field and electrical field into frequency components;
    calculating the cross-power of the data from each of the measurements, and stacking the resulting complex products in a cross-power matrix;

calculating as a function of frequency the impedance at each point, the impedance being ratio between two elements of the cross-power matrix;
  numerator of the ratio is the cross-power of the line electric field data for each dipole with the collimating electric field data; and
  the denominator of the ratio is the cross-power of the line magnetic field data with the collimating electric field data.

5. An electromagnetic geophysical survey method as described in claim 4, wherein the step of taking a collimating electric field measurement consists of measuring the dipole composed of the outermost pair of electrodes of the group of electrodes being measured which is less than all the electrodes along the survey line.

6. An electromagnetic geophysical survey method for a survey line comprising:
  measuring the variations in the earth's electrical field parallel to the survey line at a plurality of points along the survey line;
  simultaneously measuring the variations in the earth's magnetic field horizontally and orthogonal to the direction of the survey line at at least one point in the vicinity of the survey line;
  simultaneously taking a collimating magnetic field measurement of the variations in the earth's magnetic field in a horizontal direction orthogonal to the direction of the survey line at at least one point remote from the noise environment of the line magnetic measurement and the group of dipoles being measured;
  transforming the measured variations in the magnetic field and electrical field into frequency components;
  calculating the cross-power of the data from each of the measurements, and stacking the resulting complex products in a cross-power matrix;
  calculating as a function of frequency the impedance at each point, the impedance being ratio between two elements of the cross-power matrix;
  numerator of the ratio is the cross-power of the line electric field data with the collimating magnetic field data; and
  the denominator of the ratio is the cross-power of the line magnetic field data with the collimating magnetic field data.

7. An electromagnetic geophysical survey method as described in either claims 4 or 6, wherein the step of measuring the variations in the earth's electrical field parallel to the survey line consists of measuring the variation in the potential differences between one or more pairs of electrodes in electrical contact with the earth and spaced at substantially equal distances along the survey line and calculating the electric field by dividing the measured potential differences by the distance between the electrodes.

8. An electromagnetic geophysical survey method as described in claim 7, wherein the variations of the potential differences between the members of a group of adjacent electrodes consisting of less than all the electrodes are measured simultaneously and the measurements for each of the groups is made sequentially.

9. An electromagnetic geophysical survey method as described in claim 8, wherein at least one pair of electrodes in one group is also a member of the adjacent group.

10. An electromagnetic geophysical survey method as described in claim 8, wherein at least one measurement of the variations of the magnetic field along the line is within one group of electrodes and the same magnetic field measurement is taken with the electric field measurement of the adjacent group.

11. An electromagnetic geophysical survey method as described in claim 8, wherein at least one dipole consisting of two electrodes is measured separate, parallel to and remote from the noise environment of electrodes on the survey line, and is measured with every group of the electrodes on the line.

12. An electromagnetic geophysical survey method as described in claim 7, wherein the weighted averages of the impedances are calculated for predetermined frequencies such that the number of impedance entered into each weighted average increases with decreasing frequency in such a way that the number is substantially proportion to the effective depth of penetration into the earth of an electromagnetic wave of that frequency.

13. An electromagnetic geophysical survey method as described in claim 12, wherein calculating the distribution of conductivity in the earth below the survey line as a function of depth from the weighted averages of the impedances.

14. An electromagnetic geophysical survey method as described in claim 12, wherein the weighted average of the impedances are calculated using a zero phase length weight function, the width of the weight function for each frequency being determined by selecting an appropriate width, obtaining a weighted average impedance using the selected function, using the weighted average so obtained to calculate the apparent depth of penetration, comparing the calculated depth of penetration with the expected depth of penetration, using the difference between the calculated and expected depths to assist in the selection of a more appropriate width, and repeating the process iteratively until a predetermined accuracy of calculation of the depth of penetration is obtained.

15. An electromagnetic geophysical survey method as described in claim 7, wherein the resistivity distribution with depth is calculated at each electric field measuring point as a function of frequency by assuming a resistivity for a given frequency, calculating a depth with a resistivity-to-depth inversion function, multiplying the calculated depth by a number, (ie: between 2 and 3) to get the length in a zero phase length weight function, convolving the adjacent dipole impedances within the window of the zero phase function to get the weighted average smoothed impedance, using this smoothed impedance to calculate a new resistivity, using the new resistivity to calculate a new depth with the resistivity-to-depth inversion, comparing the new depth with the previous depth and continuing to iterate until the new depth differs from the previous depth by a predetermined fractional amount, then saving the new depth and resistivity for that frequency as the best fit estimates, and continue with the next frequency until all the measuring points have been calculated for all frequencies.

* * * * *